(12) United States Patent
Ray et al.

(10) Patent No.: US 11,630,594 B2
(45) Date of Patent: *Apr. 18, 2023

(54) STORING DATA BASED ON A PROBABILITY OF A DATA GRAPH

(71) Applicant: Micron Technology, Inc., Boise, ID (US)

(72) Inventors: Anirban Ray, Santa Clara, CA (US); Samir Mittal, Palo Alto, CA (US); Gurpreet Anand, Pleasanton, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/471,841

(22) Filed: Sep. 10, 2021

(65) Prior Publication Data

US 2021/0405876 A1 Dec. 30, 2021

Related U.S. Application Data

(63) Continuation of application No. 16/530,833, filed on Aug. 2, 2019, now Pat. No. 11,119,679.

(51) Int. Cl.
  *G06F 3/06* (2006.01)
  *G06F 16/901* (2019.01)
  (Continued)

(52) U.S. Cl.
  CPC ............ *G06F 3/064* (2013.01); *G06F 3/0607* (2013.01); *G06F 3/0679* (2013.01); *G06F 12/0862* (2013.01); *G06F 16/9024* (2019.01); *G06N 7/005* (2013.01); *G06F 12/0246* (2013.01); *G06F 2212/6024* (2013.01)

(58) Field of Classification Search
  CPC .... G06F 3/0604; G06F 3/0607; G06F 3/0611; G06F 3/0638; G06F 3/064; G06F 3/0649; G06F 3/0653; G06F 3/067; G06F 3/0679; G06F 3/0685; G06F 12/0246; G06F 12/0862; G06F 16/9024; G06F 2212/1024; G06F 2212/6024; G06N 7/005; G06N 20/00

See application file for complete search history.

(56) References Cited

U.S. PATENT DOCUMENTS 7,716,425 B1 * 5/2010 Uysal ................. G06F 12/0862
  711/137
2003/0217230 A1 11/2003 Rodriguez et al.
(Continued)

*Primary Examiner* — Larry T Mackall
(74) *Attorney, Agent, or Firm* — Lowenstein Sandler LLP

(57) ABSTRACT

A graph can be generated based on an access pattern associated with blocks of a memory device that have been accessed by a host system, wherein the graph comprises nodes representing at least a subset of the blocks that have been accessed by the host system and edges that are based on the access pattern, wherein each edge is associated with a respective probability value between a respective pair of nodes. A number of edges having respective probability values that satisfy a probability value threshold criterion can be determined. It can be determined whether the number of edges satisfies a decayed edge value condition. In response to determining that the number of edges does not satisfy the decayed edge value condition, the graph can be removed.

20 Claims, 12 Drawing Sheets

(51) Int. Cl.
*G06N 7/00* (2023.01)
*G06F 12/0862* (2016.01)
*G06F 12/02* (2006.01)

(56) References Cited

U.S. PATENT DOCUMENTS

2012/0023041 A1  1/2012  Kariv et al.
2013/0142438 A1  6/2013  Schloegel et al.
2014/0072171 A1  3/2014  Tu et al.
2015/0032967 A1  1/2015  Udayashankar
2015/0212943 A1  7/2015  Yang et al.

* cited by examiner

STORING DATA BASED ON A PROBABILITY OF A DATA GRAPH

RELATED APPLICATIONS

This application is a continuation application of co-pending U.S. patent application Ser. No. 16/530,833, filed on Aug. 2, 2019, which is herein incorporated by reference.

TECHNICAL FIELD

The present disclosure generally relates to a memory sub-system, and more specifically, relates to storing data based on a probability of a data graph for a memory sub-system.

BACKGROUND

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
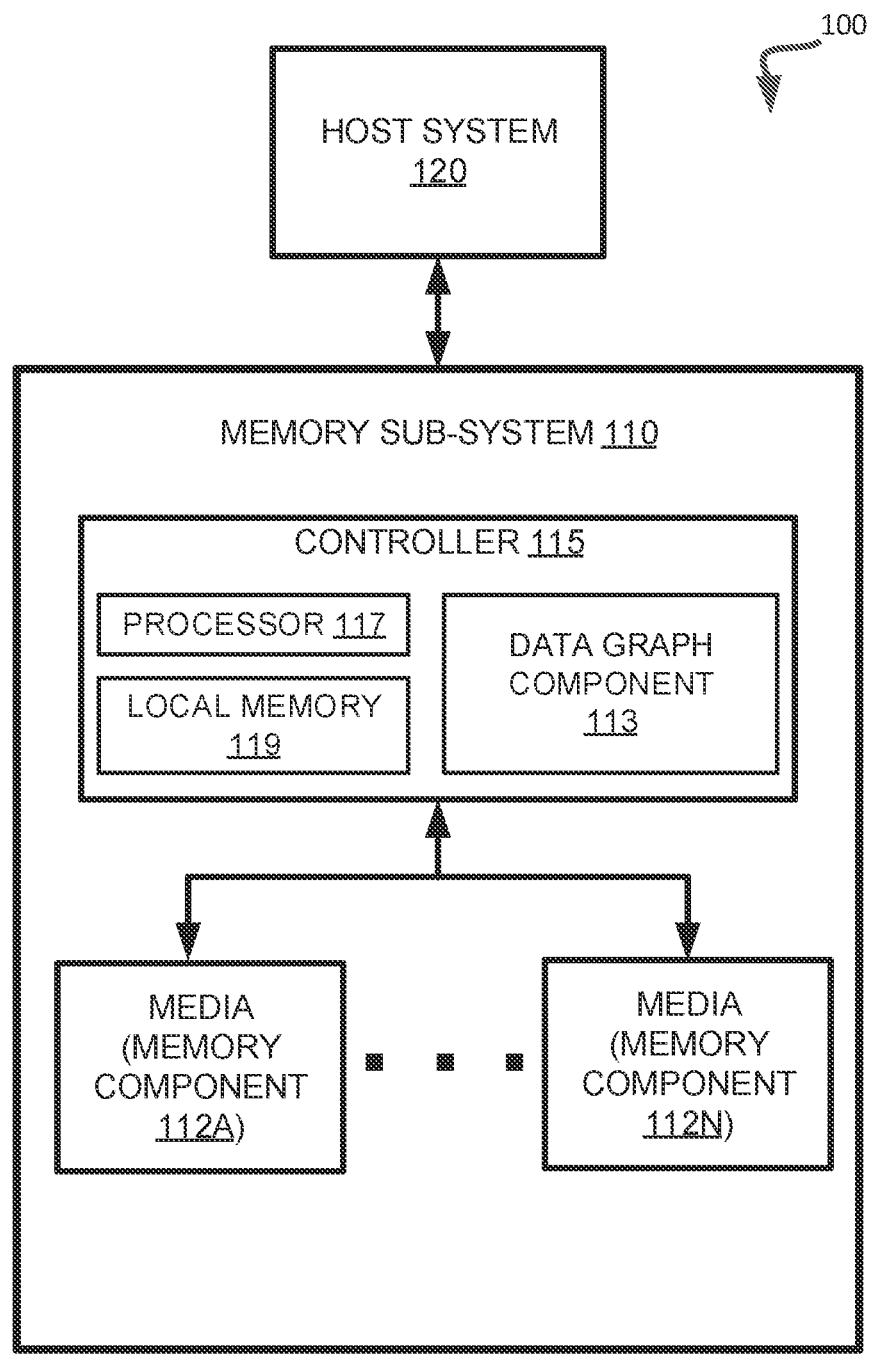
FIG. 1 illustrates an example computing environment that includes a memory sub-system in accordance with some embodiments of the present disclosure.

Aspects of the present disclosure are directed to storing data based on a probability of a data graph for a memory sub-system. A memory sub-system is also hereinafter referred to as a "memory device." An example of a memory sub-system is a storage device that is coupled to a central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc. The memory sub-system can be a hybrid memory/storage sub-system. In general, a host system can utilize a memory sub-system that includes one or more memory components. The host system can provide data to be stored at the memory sub-system and can request data to be retrieved from the memory sub-system.

A conventional memory sub-system can utilize multiple tiers or types of memory components. For example, the memory sub-system can store data at different tiers of memory components where each tier includes a type of memory component that has a different performance characteristic. The memory sub-system can store data at memory components where one of the types of memory components can provide faster performance or result in less latency than another type of memory component. The memory sub-system can attempt to retrieve (i.e., fetch) data from a memory component providing slower performance ("slower memory component") and store the retrieved data at a memory component providing faster performance ("faster memory component") before the host system has requested the data. For example, the memory sub-system can identify that a particular data block is typically the next data block requested by the host system after an initial data block has been requested. In such a case, the next data block can be retrieved from the slower memory component and then stored at the faster memory component before the host system has provided a request for the next data block. Such a pre-fetching operation can result in reduced latency of read operations for the host system. However, detecting such patterns of requesting or accessing data blocks can be difficult for the conventional memory sub-system. For example, requests for data blocks can be received from the operating system and various applications on the host system in such a manner that the requests for the data blocks are mixed between the operating system and various applications.

Aspects of the present disclosure address the above and other deficiencies by creating a data graph with nodes representing data blocks being accessed in a memory sub-system and edges representing the order of such accesses, and associating each edge with a probability to indicate how likely a respective order will be followed in the future. For example, a pre-fetching operation or predictive migration of data between a slower type of memory component (i.e., far storage) and a faster type of memory component (i.e., near storage) can be based on the probabilities assigned to the edges of a data graph. As mentioned above, the data graph can include multiple nodes where each node represents a data block that has been accessed. For example, a first node of a pair of nodes can be connected with a second node by an edge when the data block represented by the second node has been requested after the data block represented by the first node has been requested by the host system. An edge value can be assigned to the edge based on a spatial characteristic and a temporal characteristic of the pair of nodes. Furthermore, the edge value can represent a probability that the data block represented by the second node of the pair of nodes will be the next requested data block. Subsequently, if the probability for the edge between the first node and the second node is high, then when the host system requests the data block represented by the first node, the memory sub-system can retrieve the data block represented the second node and store the data block of the second node at the faster type of memory component. The edge value for each pair of nodes can be updated or modified over time as additional requests for data blocks are received by the memory sub-system. Subsequently, the data block represented by the second node can be returned to the host system from the faster type of memory component when the host system requests the data block.

Advantages of the present disclosure include, but are not limited to, improved performance of the memory sub-system as latencies for performing read operations can be reduced. For example, since data can be more accurately pre-fetched by utilizing the probabilities of the data graph, the memory sub-system can return data blocks requested by the host system in less time as the data blocks can be pre-fetched and stored at the faster type of memory component before being returned to the host system. Additionally, more complex data block access patterns can be identified by using the data graphs as edge values between pairs of nodes of the data graph can be updated based on each access of a data block that is represented by a node in the data graph.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a data graph component 113 that can be used to generate and utilize a data graph for the memory sub-system 110. In some embodiments, the controller 115 includes at least a portion of the data graph component 113. For example, the controller 115 can include a processor 117 (processing device) configured to execute instructions stored in local memory 119 for performing the operations described herein. In some embodiments, the data graph component 113 is part of the host system 120, an application, or an operating system. In the same or alternative embodiments, portions of the data graph component 113 are part of the host system 120 while other portions of the data graph component 113 are performed at the controller 115.

The data graph component 113 can be used to generate a data graph for data blocks of the memory sub-system 110. For example, nodes of the data graph can represent data blocks that have been frequently accessed by the host system 120. The data graph component 113 can generate edge values between pairs of nodes based on a spatial characteristic and a temporal characteristic of a respective pair of nodes. Subsequently, data can be stored at the memory sub-system based on the edge values between pairs of the nodes included in the data graph. For example, data blocks can be pre-fetched or migrated from a slower type of memory component to a faster type of memory component based on the data graph. Further details with regards to the operations of the data graph component 113 are described below.

Figure 2:
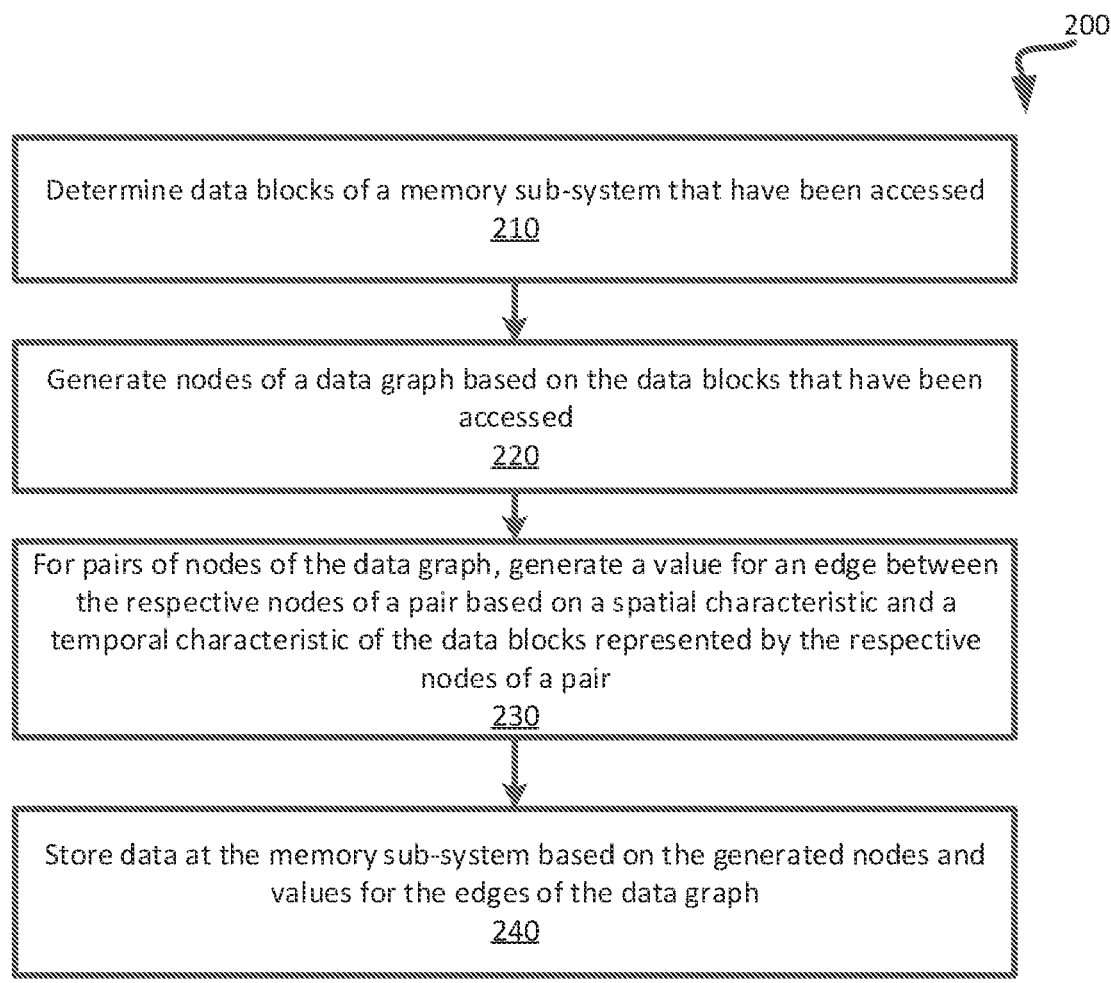
FIG. 2 is a flow diagram of an example method to store data at a memory sub-system based on values between nodes of a data graph in accordance with some embodiments.

FIG. 2 is a flow diagram of an example method 200 to store data at a memory sub-system based on values between nodes of a data graph in accordance with some embodiments. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the data graph component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 2, at operation 210, the processing logic determines data blocks of a memory sub-system that have been accessed. For example, a pattern of read operations requested by a host system can be recorded. The read operations can specify data blocks that are to be accessed or that have been accessed. A data block can be a unit of data. For example, a data block can be a unit of data that the memory sub-system is to operate upon. Thus, data block can refer to any logical or physical grouping of data for any type of memory component. At operation 220, the processing logic generates nodes of a data graph based on the data blocks that have been accessed. Each node of the graph can represent a different data block that has been accessed by the host system. For example, a node can represent a physical data block of the memory sub-system. In some embodiments, the nodes of the graph can represent the data blocks that have been more frequently accessed than other data blocks of the memory sub-system. Thus, the graph can include a number of nodes that represent a subset of the data blocks that have been accessed more frequently by the host system. In some embodiments, the data blocks that have been accessed can be ordered or ranked based on the access frequencies of each of the data blocks. The nodes of the graph can then represent the top number or a particular percentage of the most frequently accessed data blocks. As such, an observation of the access patterns of the data blocks can be used to generate the nodes of the data graph.

At operation 230, the processing logic generates, for pairs of nodes of the graph, a value for an edge between the respective nodes of a pair based on a spatial characteristic and a temporal characteristic of the data blocks represented by the respective nodes of the pair. An edge between two nodes can represent that one data block represented by the pair of nodes was requested by the host system after the host system requested the other data block represented by the other node of the pair of nodes. Thus, the pair of nodes can represent an initial data block that has been requested and the next requested data block or a subsequent second data block. The value for the edge (i.e., the edge value) can represent a probability that the second data block represented by one of the nodes in the pair (i.e., the destination node) will be requested by the host system when the host system later requests the first data block that is represented by the other node (i.e., the source node). For example, the edge value represents the probability that a next data block that will be requested after a first data block represented by the first node of the pair of nodes has been requested by the host system will be the second data block represented by the second node of the pair of nodes. The spatial characteristic can represent a distance or physical proximity between data blocks. For example, the spatial characteristic can be based on physical block addresses that are assigned to each data block. If the difference between physical block addresses of two nodes is small (e.g., the physical block addresses are consecutive block addresses or the difference between the two addresses is within a certain threshold), then the spatial characteristic can be represented by a higher value than if the difference between the physical block addresses of the two nodes is large (e.g., the difference between the two addresses exceeds a certain threshold). The temporal characteristic can represent how often a data block has been accessed within a defined time period or an amount of time that has elapsed since a data block has been accessed. As described in further detail below with respect to FIGS. 4A, 5A, and 5B, the edge value can initially be determined based on the spatial characteristic and can be increased or decreased based on the temporal characteristic of the data blocks represented by the pair of nodes. The data graph can be a probability graph as further described with respect to FIG. 3A or a Bayesian graph as further described with regards to FIG. 3B.

At operation 240, the processing logic may store data at the memory sub-system based on the generated nodes and the values for the edges of the data graph. For example, data blocks can be pre-fetched or data can be migrated between tiers of memory components based on the probability values represented by the nodes and edge values of the graph that has been generated. In some embodiments, when the host system requests a data block that is represented by a node in the graph, then another data block connected to the data block with an edge with the highest edge value (i.e., highest probability) can be pre-fetched or migrated to a different tier of memory component prior to the host system requesting the other data block.

As such, a data graph can be generated. The data graph can be generated based on access history of the host system for data blocks of a memory sub-system. Nodes of the data graph can represent data blocks that have been more frequently accessed by the host system. Edge values can be determined between pairs of the nodes that represent data blocks. For example, an edge can represent a subsequent data block that may be requested after a prior data block has been requested. The edge value can represent a probability of the subsequent data block being the next requested data block after the prior data block has been requested. The probability value can be based on the spatial characteristic and the temporal characteristic associated with the data blocks represented by a pair of nodes.

Figure 3A:
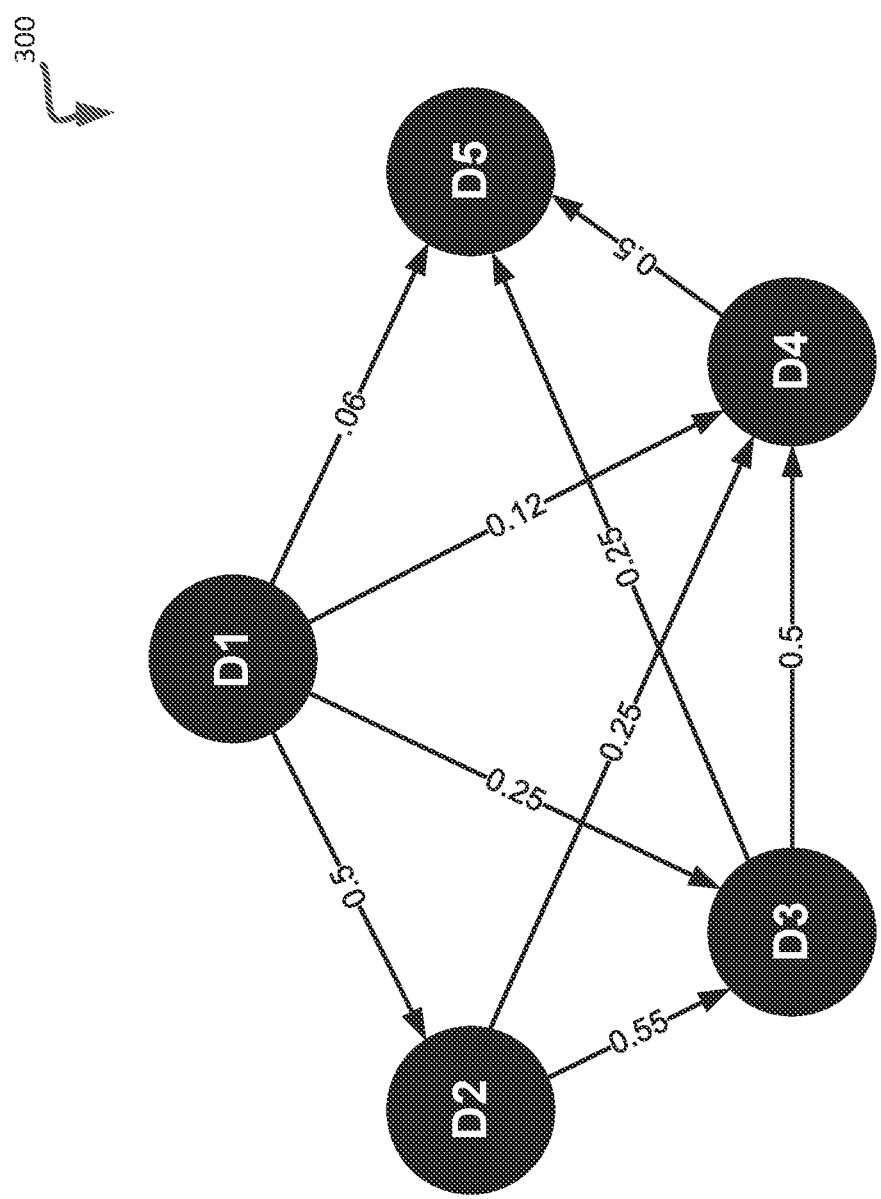
FIG. 3A illustrates a data graph that corresponds to a probability graph in accordance with some embodiments of the present disclosure.

FIG. 3A illustrates a data graph 300 that corresponds to a probability graph in accordance with some embodiments of the present disclosure. The data graph 300 can be generated by the data graph component 113 of FIG. 1.

As shown in FIG. 3A, the data graph can be a probability graph. For example, a probability graph data model can be generated by machine learning of the access patterns of data blocks. The nodes of the data graph 300 can represent data blocks that have been more frequently accessed. For example, the nodes can represent data blocks 1 through 5 that are more frequently accessed within a time period than other data blocks. The edges between the nodes can represent a probability that a next data block will be accessed by the host system. For example, the edge value between the node D1 (i.e., data block 1) and the node D2 (i.e., data block 2) is shown as 0.5 which represents that there is a 50% probability that data block 2 will be requested by the host system after data block 1 has been accessed or requested by the host system. In some embodiments, an edge can connect two nodes when a data block of a destination node has been requested within a look-ahead number of a data block of a source node. For example, the edge can be established between node D1 and node D2 when the second data block has been requested within the look-ahead number of data blocks after the first data block has been requested. Thus, if the look-ahead number is five data blocks, then the edge can be established between the nodes D1 and D2 when the second data block is at least one of the next five data blocks (or a data block specified in the next five read operations) that has been requested by the host system after the first data block has been accessed.

The various edge values for the edges can be based on a spatial characteristic and a temporal characteristic of the data blocks. The spatial characteristic can be based on a proximity of data blocks and the temporal characteristic can increase or decrease the edge values over time as described in further detail below.

Figure 3B:
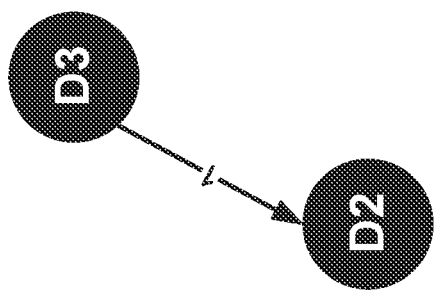
FIG. 3B illustrates a data graph that corresponds to a Bayesian model in accordance with some embodiments of the present disclosure.
Figure 3B:
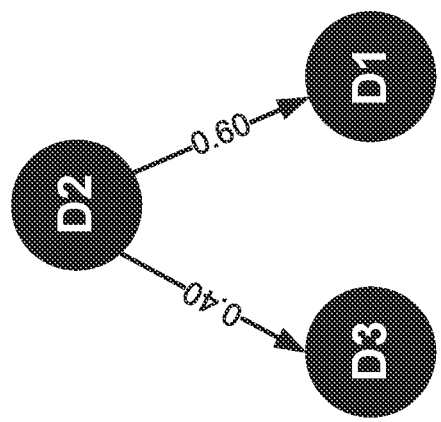
Figure 3B:
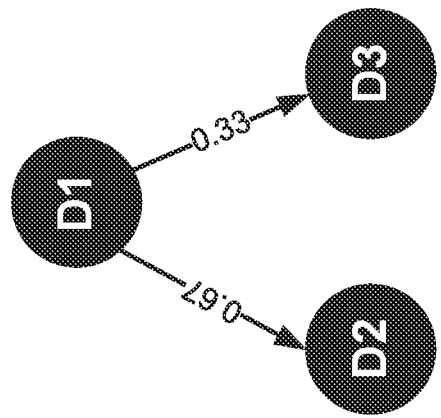

FIG. 3B illustrates a data graph 350 that corresponds to a Bayesian model in accordance with some embodiments of the present disclosure. The data graph 350 can be generated by the data graph component 113 of FIG. 1.

As shown in FIG. 3B, the data graph 350 can be a Bayesian model. For example, the nodes can represent various data blocks. In some embodiments, the nodes can represent the most frequently accessed data blocks as previously described with respect to the probability graph. Similarly, the edge values can represent the probability of a next data block being requested by the host system. The various edge values can also be based on a spatial characteristic and a temporal characteristic. Additionally, the edge values of the Bayesian model can be based on a historical path from a source node to a target node of a pair of nodes. For example, the edge values between a pair of nodes can be based on the prior accesses that occurred prior to the data block of the source node of the pair of nodes being accessed.

Figure 4A:
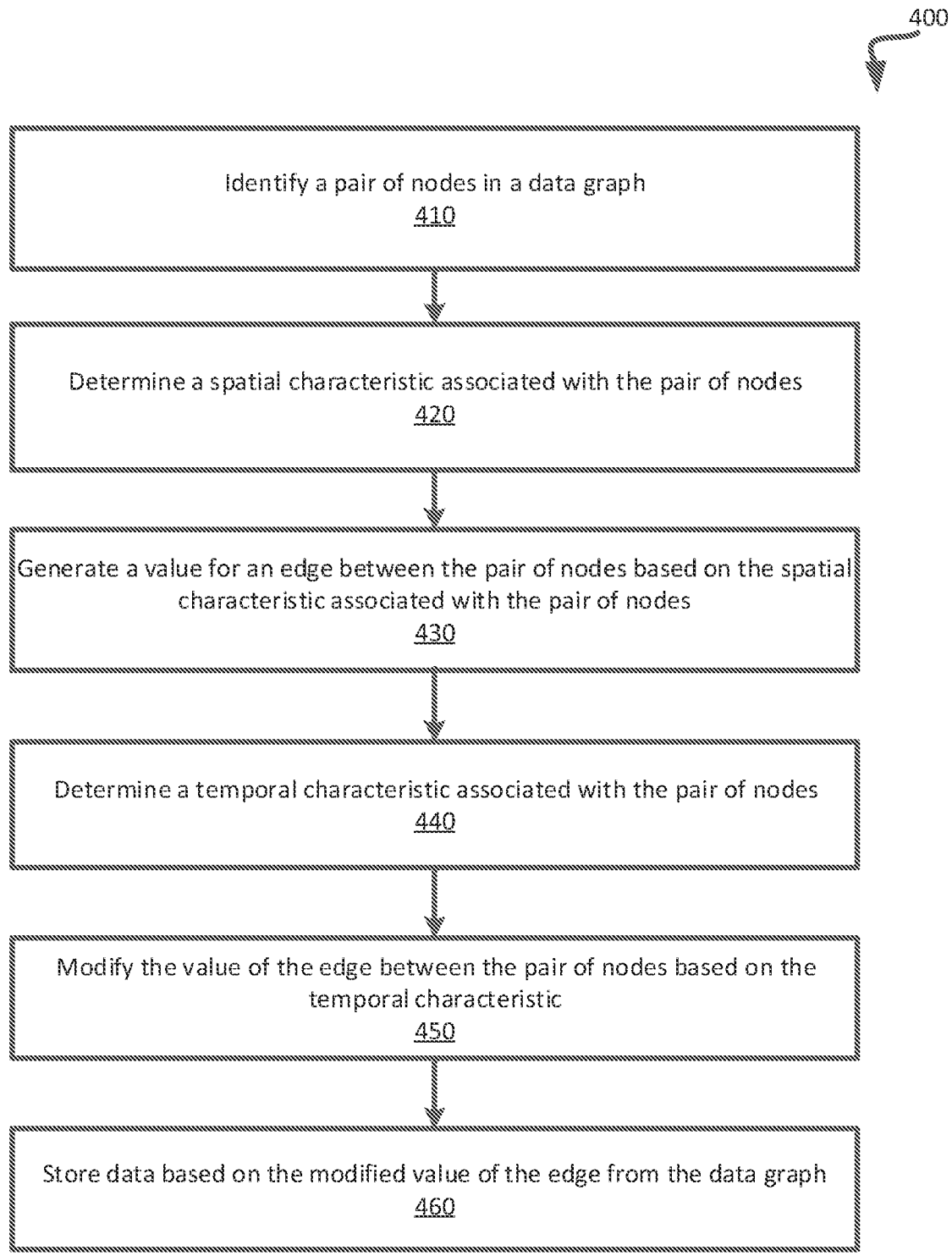
FIG. 4A is a flow diagram of an example method to store data based on modified edge values of a data graph in accordance with some embodiments.

FIG. 4A is a flow diagram of an example method 400 to store data based on modified edge values of a data graph in accordance with some embodiments. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the data graph component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 4A, at operation 410, the processing logic identifies a pair of nodes in a data graph. For example, the pair of nodes can include a source node and a destination node where the destination node represents a destination data block that has been requested within a look-ahead number of data blocks after the source data block of the source node has been requested. At operation 420, the processing logic determines a spatial characteristic associated with the pair of nodes. The spatial characteristic can represent a spatial proximity between the source data block and the destination data block. The spatial proximity can represent a difference between physical block addresses of the source data block and the destination data block. At operation 430, the processing logic generates a value for an edge between the pair of nodes based on the spatial characteristic associated with the pair of nodes. For example, a probability value can be generated from the spatial proximity between the source data block and the destination data block. In some embodiments, the probability value can be higher when the source data block is more proximate to the destination data block or when the difference between physical block addresses is smaller than when the data blocks are less proximate or the difference between physical block addresses is larger. In some embodiments, the probability value for an edge can be determined based on the following formula:

$$P(a,b)=W(a,b)/\Sigma[W(a,i)]$$

In some embodiments, W(a,b) is a weight value between two nodes(i.e., nodes 'a' and 'b') that represent two data blocks, and W(a,i) represents the other weight values of other nodes that are connected with the node 'a.' The weight value can be set to an initial value (e.g, '1') and can be increased or decreased based on a decay function f(x)=exp(−0.7*x) where 'x' is the position of the data block in the look-ahead window or look-ahead position. In some embodiments, the oldest data block in the looked-ahead window or position can be assigned the 'x' value of 0.

At operation 440, the processing logic determines a temporal characteristic associated with the pair of nodes. The temporal characteristic can be based on a number of times that the destination data block has been accessed after the source data block (e.g., within the look-ahead number of requested data blocks). At operation 450, the processing logic modifies the value of the edge between the pair of nodes based on the temporal characteristic. For example, the probability corresponding to the edge value can be increased when the destination block has been accessed more frequently after the source data block has been accessed and the probability can be decreased when the destination block has been accessed less frequently after the source data block has been accessed. The decrease in the probability can be based on the decay function f(x) as previously described. At operation 460, the processing logic stores data based on the modified value of the edge from the data graph. For example, data can be migrated or pre-fetched based on the various probabilities identified from the data graph.

In some embodiments, the data graph may be generated based on training data. For example, the data graph may be generated based on training data that represents access history of data blocks. When the data graph has been completed (e.g., a threshold number of edge values or nodes have been generated), then the data graph may be provided for use to store data blocks. For example, the data graph may then be used to migrate or pre-fetch data blocks by using the data graph. Furthermore, the data graph may be updated based on temporal characteristics and other such access patterns observed during the use of the data graph.

Figure 4B:
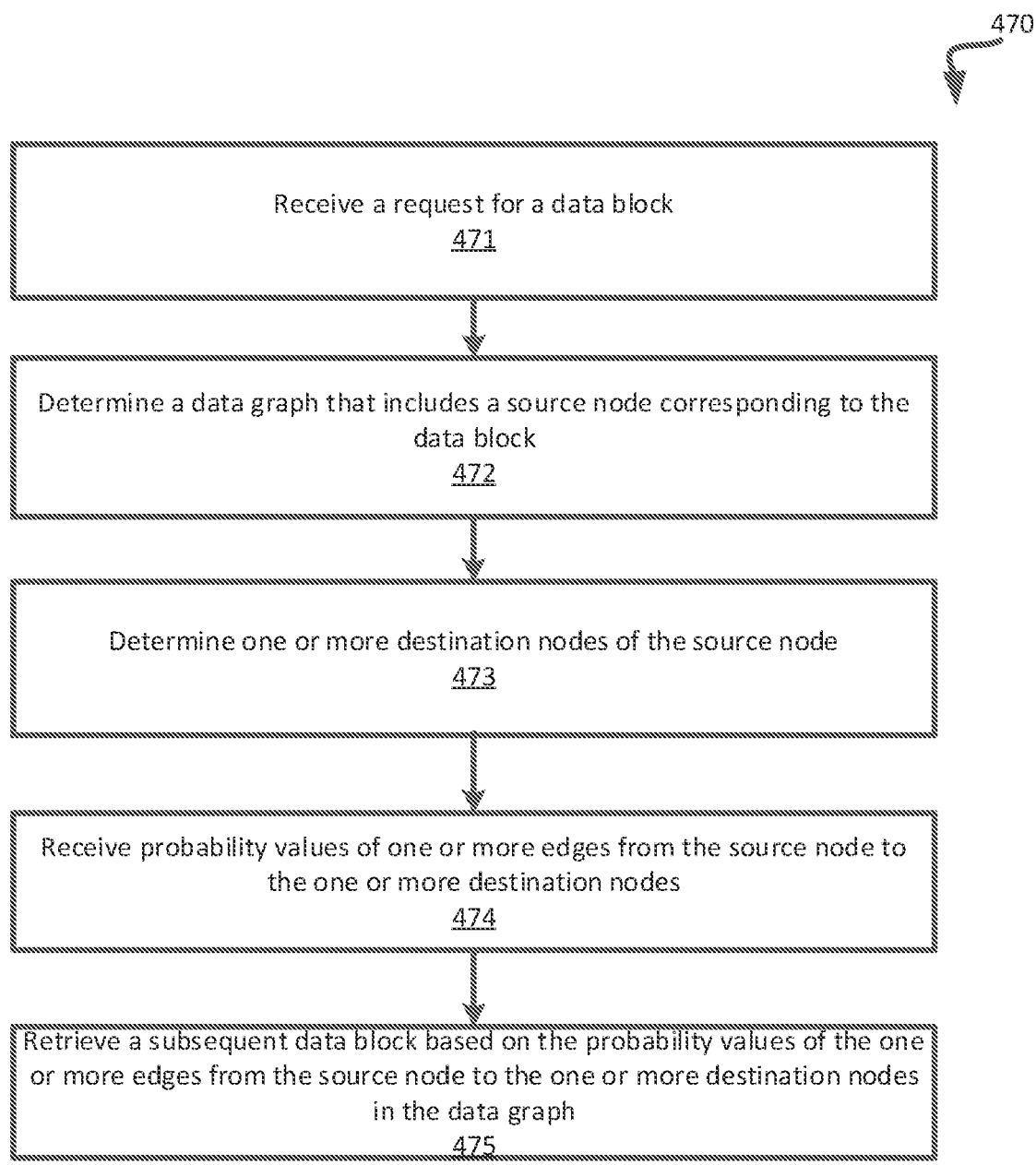
FIG. 4B is a flow diagram of an example method to retrieve data based on probability values of a data graph in accordance with some embodiments.

FIG. 4B is a flow diagram of an example method 470 to retrieve data based on probability values of a data graph in accordance with some embodiments. The method 470 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 470 is performed by the data graph component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 4B, at operation 471, the processing logic receives a request for a data block. For example, a host system can provide a read operation specifying the data block. At operation 472, the processing logic determines a data graph that includes a source node corresponding to the data block. For example, a memory sub-system can include multiple data graphs where each data graph includes different groups of nodes that represent different groups of data blocks. A determination can be made as to whether any of the data graphs includes the data block specified in the request. If no data graph includes the data block, then the data block can be retrieved without using a data graph. Otherwise, a particular data graph that includes a source node that represents the requested data block can be identified. At operation 473, the processing logic determines one or more destination nodes of the source node. For example, nodes that are connected with the source node with an edge can be identified. At operation 474, the processing logic receives probability values of one or more edges from the source node to the one or more destination nodes. For example, the probability values can be the edge values that have been previously generated based on the spatial characteristic and subsequently modified based on a temporal characteristic. At operation 475, the processing logic retrieves a subsequent data block based on the probability values of the one or more edges from the source node to the one or more destination nodes in the data graph. For example, as previously described, a subsequent data block can be pre-fetched or migrated to a faster memory component. The subsequent data block can be a data block with the highest probability value (e.g., connected to the source data block with the highest edge value) and/or the data block is assigned a probability value that is higher than a threshold probability value. As such, a subsequent data block can be determined to be retrieved before or prior to being requested by the host system (e.g., with the requested data block) by using the probability values of the data graph. Thus, the data graphs that were previously generated can be used when a subsequent read operation or request is received from the host system.

Figure 5A:
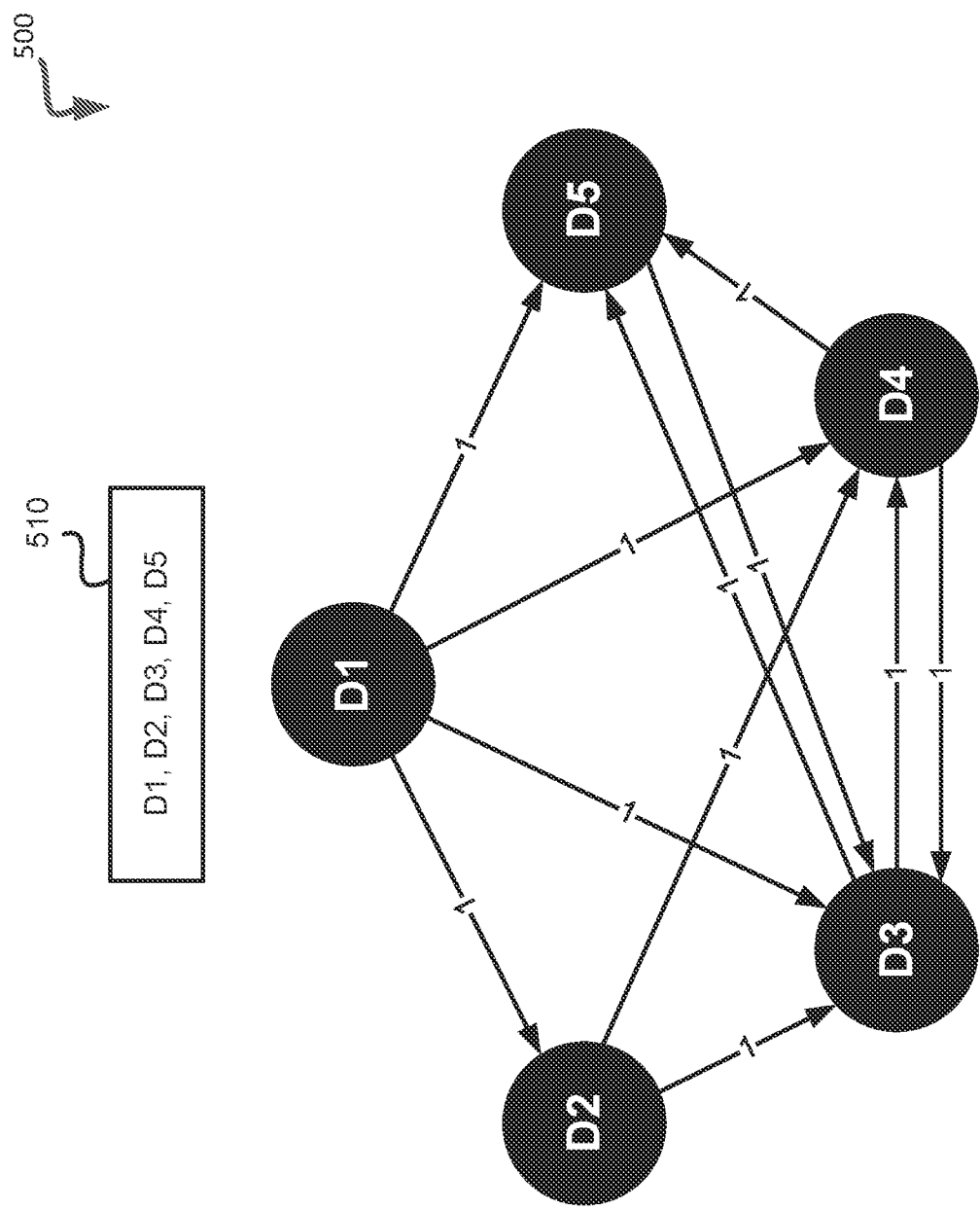
FIG. 5A illustrates a data graph in accordance with some embodiments of the present disclosure.

FIG. 5A illustrates a data graph 500 in accordance with some embodiments of the present disclosure. The data graph 500 can be generated by the data graph component 113 of FIG. 1.

As shown in FIG. 5A, the data graph 500 can be generated for frequently accessed data blocks. Initially, the data graph 500 can include edge values that represent high probabilities of a data block being accessed after another data block in a lookback sequence 510. For example, the lookback sequence 510 can represent the total number of prior data block accesses that are used to generate the data graph 500. For example, since each of the data blocks 1 through 5 are included in the lookback sequence 510, the edge values of each data block can be a value of '1' at an initial time when the data graph 500 is generated.

Figure 5B:
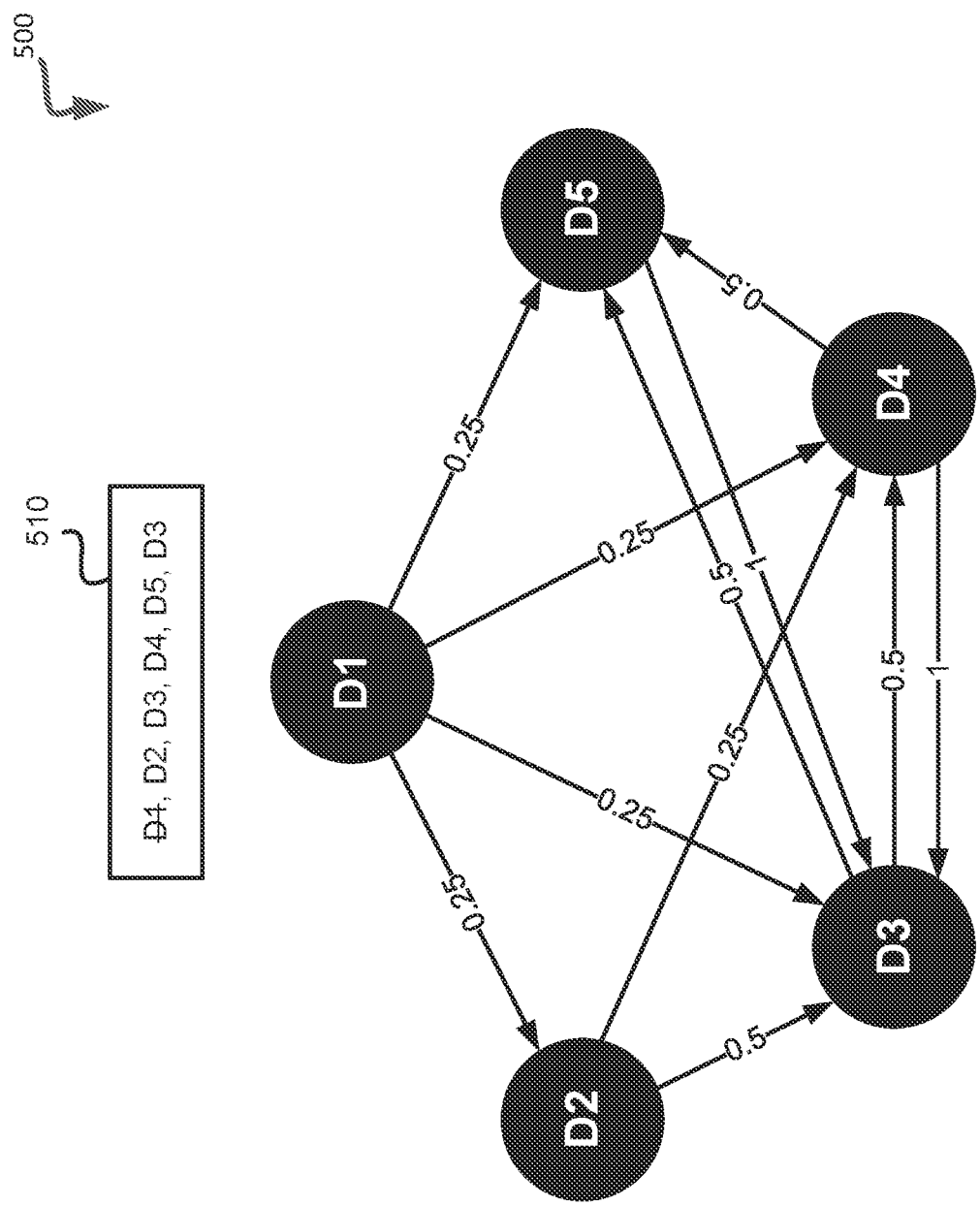
FIG. 5B illustrates the changing of edge values of the data graph in accordance with some embodiments of the present disclosure.

FIG. 5B illustrates the changing of edge values of the data graph in accordance with some embodiments of the present disclosure. For example, the probabilities assigned to the various edges can be changed based on different data blocks being accessed in the lookback sequence 510. For example, the next data block that is accessed can be data block 3 and data block 1 can no longer be included in the lookback sequence 510. As such, the probability values of the edges from the data block 1 can be decreased while probabilities associated with edges of data block 3 can be increased. Thus, a subsequent access of data blocks can increase or decrease the edge values of the data graph.

Figure 6:
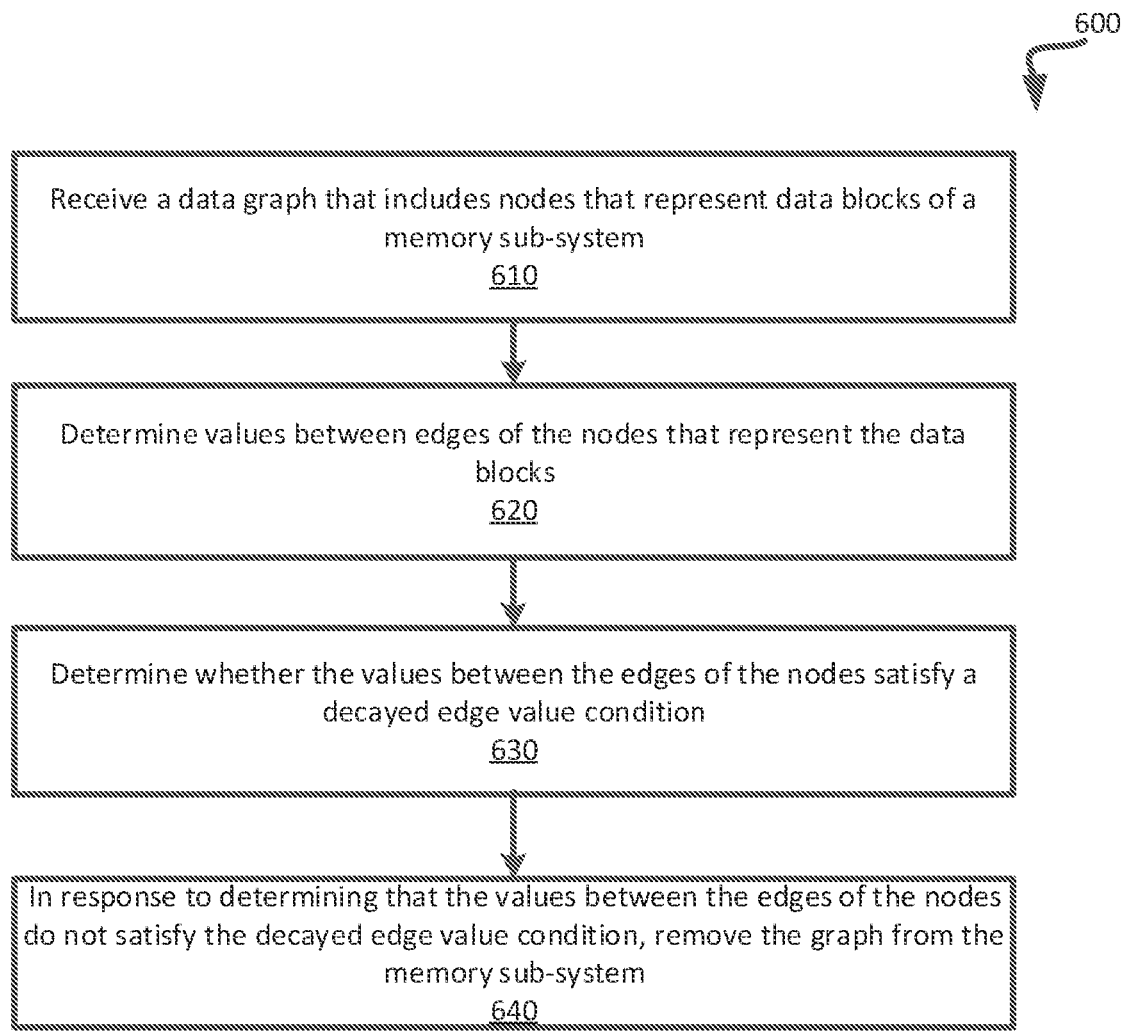
FIG. 6 is a flow diagram of an example method to remove a data graph from a memory sub-system in accordance with some embodiments.

FIG. 6 is a flow diagram of an example method 600 to remove a data graph from a memory sub-system in accordance with some embodiments. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the data graph component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 6, at operation 610, the processing logic receives a data graph that includes nodes that represent data blocks of a memory sub-system. The data graph can be one of multiple data graphs that are used to represent different groups of data blocks of the memory sub-system. For example, different groups of data blocks that are associated with different respective access patterns can be represented by separate data graphs. At operation 620, the processing logic determines values for edges of the nodes that represent the data blocks. For example, the probabilities between data blocks that are included in the data graph can be received. At operation 630, the processing logic determines whether the values between the edges of the nodes satisfy a decayed edge value condition. The decayed edge value condition can represent a threshold number of edges that have been assigned a probability value that satisfies a probability value threshold. The decayed edge value condition can be satisfied when a total number of edges of the data graph have been assigned probability values that are equal to or higher than the probability value threshold. Furthermore, the decayed edge value condition is not satisfied when the total number of edges of the data graph have probability values that are lower than the probability value threshold. Thus, the decayed edge value condition can represent whether the data graph if useful to predict subsequent data block accesses when the probability values of the edges are higher or whether the data graph is not useful to predict subsequent data block accesses when the probability values of the edges are low. At operation 640, the processing logic removes the data graph from the memory sub-system in response to determining that the values between the edges of the nodes do not satisfy the decayed edge value condition. For example, the data graph can be stored in a volatile memory of the memory sub-system that includes limited capacity. The removal of the data graph that is considered to be less useful for subsequent data block accesses can result in a subsequent data graph to be generated and stored at the volatile memory (e.g., within the controller of the memory sub-system). As such, if the pattern of accessing of data blocks changes, a data graph that is considered less useful can be removed or deleted.

Figure 7A:
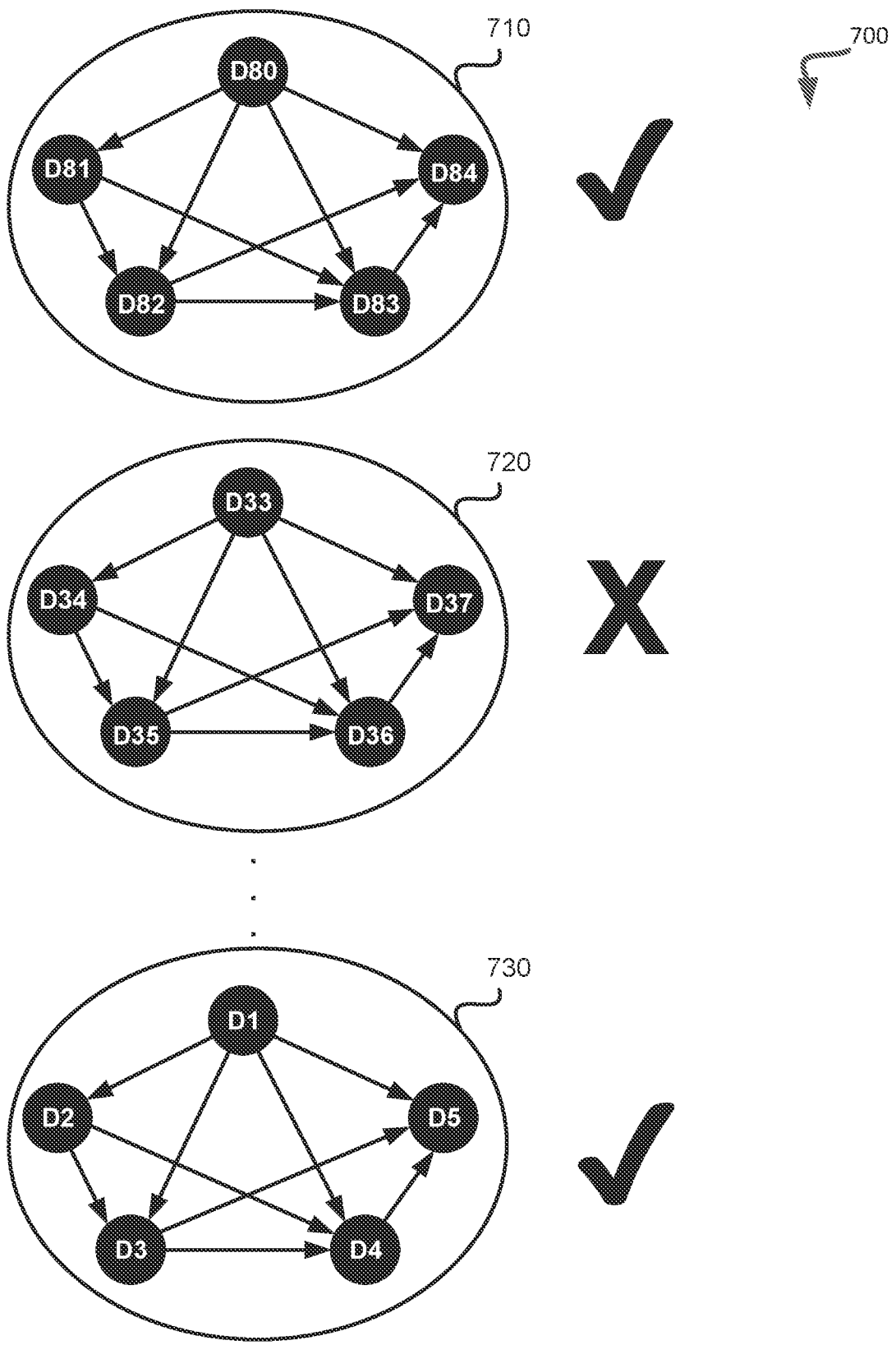
FIG. 7A illustrates multiple data graphs of a memory sub-system in accordance with some embodiments of the present disclosure.
Figure 7B:
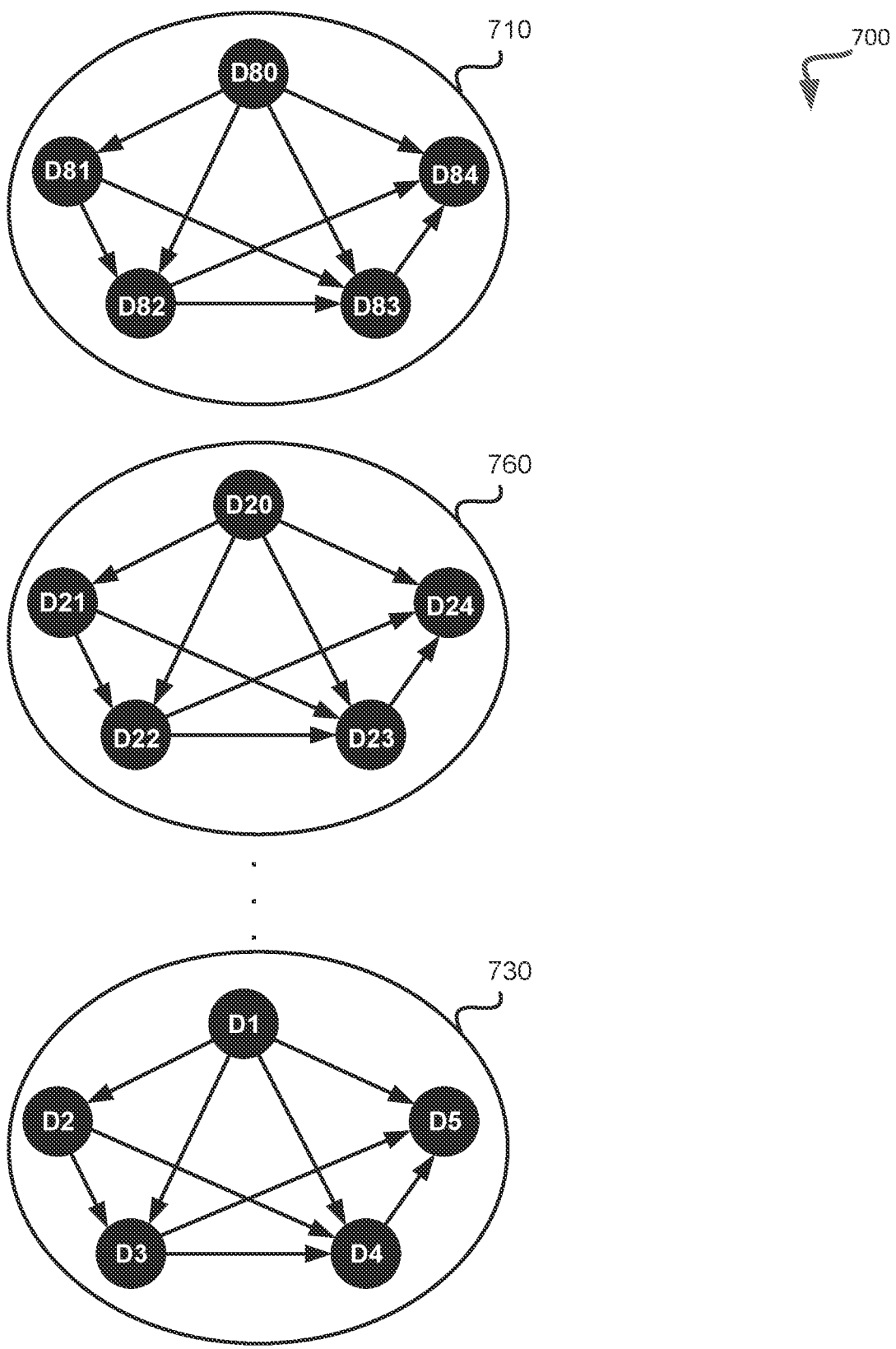
FIG. 7B illustrates the replacement of a data graph of the memory sub-system in accordance with some embodiments.

FIG. 7A illustrates multiple data graphs 700 of a memory sub-system in accordance with some embodiments of the present disclosure. As shown, the data graphs 700 may represent different groups of data blocks. For example, the first data graph 710 can represent a first group of data blocks, the second data graph 720 can represent a second group of data blocks, and the third data graph 730 can represent a third group of data blocks. Although three data graphs are shown, any number of data graphs can be generated and stored at the memory sub-system. As previously described, the probabilities or edge values assigned to various pairs of nodes of the data graphs can change over time. Thus, the first data graph 710 and the third data graph 730 can include nodes with edges that are assigned high probabilities that satisfy a decayed edge value condition while the second data graph 720 can include a larger number of nodes with edges that are assigned low probabilities that do not satisfy the decayed edge value condition. Thus, the first data graph 710 and the third data graph 730 can still be considered useful to predict the next data blocks that will be requested while the second data graph 720 can be considered to not be useful to predict the next data blocks that will be requested. FIG. 7B illustrates the replacement of a data graph of the memory sub-system in accordance with some embodiments. For example, as shown, the second data graph 720 can be removed and a new fourth data graph 760 can be generated and used to pre-fetch data blocks or migrate data blocks. For example, the fourth data graph 760 can be generated for a different group of data blocks that have been more frequently accessed.

Figure 8:
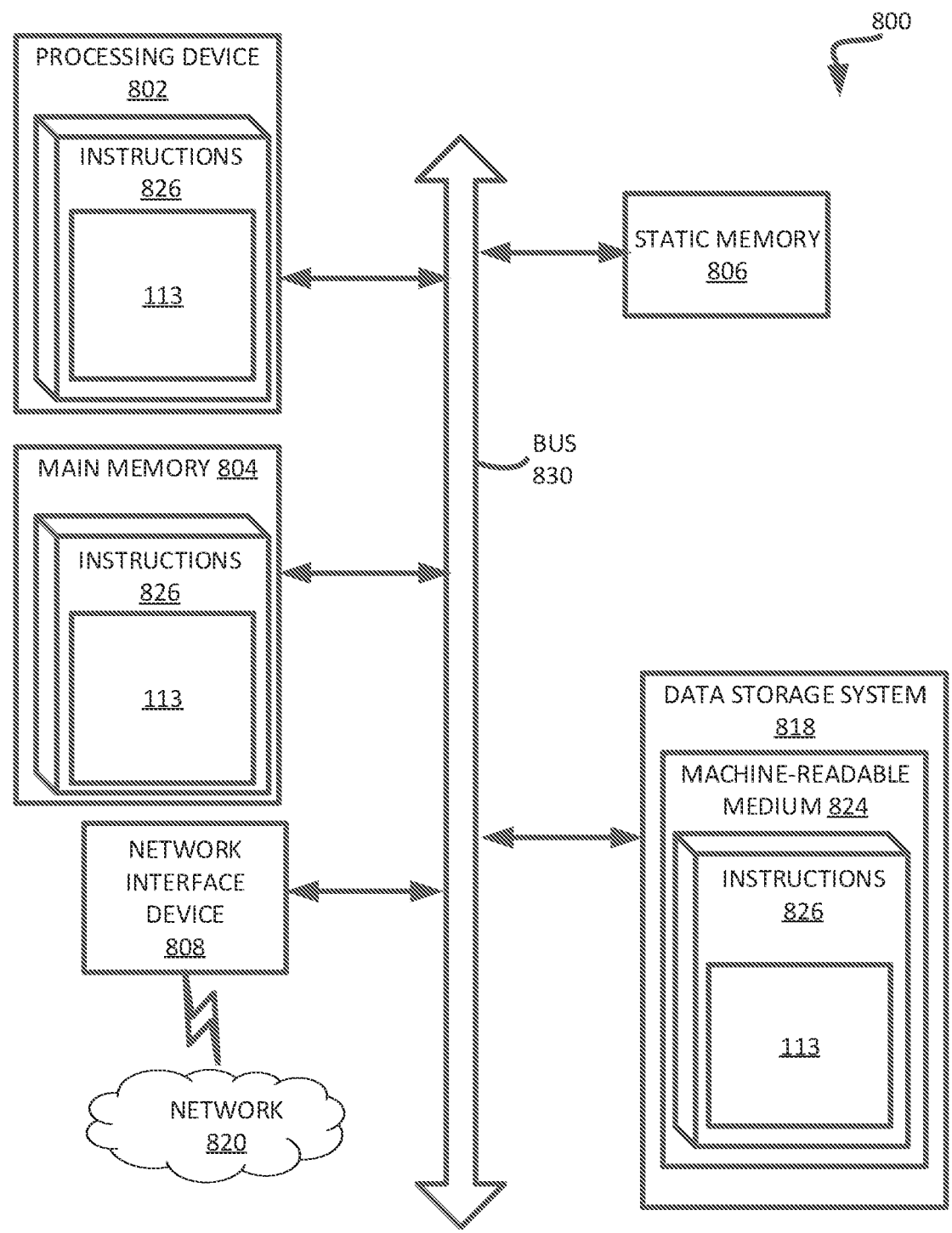
FIG. 8 is a block diagram of an example computer system in which implementations of the present disclosure can operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to a data graph component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, digital or non-digital circuitry, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1.

In one embodiment, the instructions 826 include instructions to implement functionality corresponding to a data graph component (e.g., the data graph component 113 of FIG. 1). While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
  generating, by a processing device, a graph based on an access pattern associated with blocks of a memory device that have been accessed by a host system, wherein the graph comprises nodes representing at least a subset of the blocks that have been accessed by the host system and edges that are based on the access pattern, wherein each edge is associated with a respective probability value between a respective pair of nodes;
  determining a number of edges of the graph having respective probability values that satisfy a probability value threshold criterion;

determining whether the number of edges satisfies a decayed edge value condition; and removing, by the processing device, the graph in response to determining that the number of edges does not satisfy the decayed edge value condition.

2. The method of claim 1, wherein the respective probability value between the respective pair of nodes is based on a spatial characteristic for the respective pair of nodes representing the blocks of the memory device, wherein the spatial characteristic corresponds to a proximity of a first block with a second block of a pair of blocks.

3. The method of claim 1, further comprising:

receiving a temporal characteristic associated with each respective pair of nodes, wherein the edge value between each respective pair of nodes is further based on the temporal characteristic associated with the respective pair of nodes, and wherein the temporal characteristic is associated with a frequency of accessing of a block represented by one of the nodes in the respective pair of nodes.

4. The method of claim 3, wherein the respective probability value between each respective pair of nodes specifies a probability that a particular block will be requested by the host system after the host system has requested a prior block.

5. The method of claim 1, wherein the nodes of the graph correspond to a subset of the blocks that are more frequently accessed by the host system than another subset of the blocks.

6. The method of claim 1, wherein the graph is associated with retrieving a block before the host system has requested the block.

7. The method of claim 1, wherein the graph is a probability graph or a Bayesian model.

8. A non-transitory computer readable medium comprising instructions, which when executed by a processing device, cause the processing device to perform operations comprising:

generating a graph based on an access pattern associated with blocks of a memory device that have been accessed by a host system, wherein the graph comprises nodes representing at least a subset of the blocks that have been accessed by the host system and edges that are based on the access pattern, wherein each edge is associated with a respective probability value between a respective pair of nodes;

determining a number of edges of the graph having respective probability values that satisfy a probability value threshold;

determining whether the number of edges satisfies a decayed edge value condition; and removing, by the processing device, the graph in response to determining that the number of edges does not satisfy the decayed edge value condition.

9. The non-transitory computer readable medium of claim 8, wherein the respective probability value between the respective pair of nodes is based on a spatial characteristic for the respective pair of nodes representing the blocks of the memory device, wherein the spatial characteristic corresponds to a proximity of a first block with a second block of a pair of blocks.

10. The non-transitory computer readable medium of claim 8, the operations further comprising:

receiving a temporal characteristic associated with each respective pair of nodes, wherein the respective probability value between each respective pair of nodes is further based on the temporal characteristic associated with the respective pair of nodes, and wherein the temporal characteristic is associated with a frequency of accessing of a block represented by one of the nodes in the respective pair of nodes.

11. The non-transitory computer readable medium of claim 10, wherein the respective probability value between each respective pair of nodes specifies a probability that a particular block will be requested by the host system after the host system has requested a prior block.

12. The non-transitory computer readable medium of claim 8, wherein the nodes of the graph correspond to a subset of the blocks that are more frequently accessed by the host system than another subset of the blocks.

13. The non-transitory computer readable medium of claim 8, wherein the graph is associated with retrieving a block before the host system has requested the block.

14. The non-transitory computer readable medium of claim 8, wherein the graph is a probability graph or a Bayesian model.

15. A system comprising:

a memory component; and a processing device, operatively coupled with the memory component, to:

receive a request to retrieve a block;

receive a graph, wherein the graph includes a source node that corresponds to a block;

receive one or more probability values of one or more edges from the source node to one or more destination nodes in the graph;

determine a number of edges of the graph having respective probability values that satisfy a probability value threshold criterion;

determine whether the number of edges satisfies a decayed edge value condition; and determine whether to retrieve a subsequent block based on the received one or more probability values of the one or more edges in the graph.

16. The system of claim 15, wherein the one or more probability values correspond to a probability that a host system will request another block represented by a respective node of the one or more destination nodes after requesting the block.

17. The system of claim 16, wherein the subsequent block is associated with a higher probability value than another block associated with the one or more destination nodes.

18. The system of claim 15, wherein the processing device is further to:

in response to determining to retrieve the subsequent block, store the subsequent block at another memory component with a different performance characteristic than the memory component, the subsequent block being stored at the another memory component prior to being requested by a host system that has provided the request to retrieve the block.

19. The system of claim 15, wherein a probability value of the one or more probability values is based on a spatial characteristic between the block represented by the source node and the subsequent block that is represented by one of the destination nodes.

20. The system of claim 15, wherein a probability value of the one or more probability values is based on a temporal characteristic between the block represented by the source node and the subsequent block that is represented by one of the destination nodes.

* * * * *